United States Patent
Edwards et al.

(10) Patent No.: US 11,719,357 B2
(45) Date of Patent: Aug. 8, 2023

(54) VALVE LEVER APPARATUS FOR USE WITH FLUID VALVES

(71) Applicant: Emerson Vulcan Holding LLC, St. Louis, MO (US)

(72) Inventors: Mark Stephen Edwards, Black Mountain, NC (US); John Scott Hutchinson, Brevard, NC (US); Steven Paul Hobbs, Saluda, NC (US)

(73) Assignee: Emerson Vulcan Holding LLC, St. Louis, MO (US)

( * ) Notice: Subject to any disclaimer, the term of this patent is extended or adjusted under 35 U.S.C. 154(b) by 0 days.

(21) Appl. No.: 16/600,192

(22) Filed: Oct. 11, 2019

(65) Prior Publication Data
US 2020/0116275 A1    Apr. 16, 2020

Related U.S. Application Data

(60) Provisional application No. 62/746,307, filed on Oct. 16, 2018.

(51) Int. Cl.
*F16K 31/60* (2006.01)
*F16K 47/02* (2006.01)

(52) U.S. Cl.
CPC .......... *F16K 31/602* (2013.01); *F16K 47/023* (2013.01)

(58) Field of Classification Search
CPC ............................. F16K 31/602; F16K 47/023
USPC ........................................................ 251/231
See application file for complete search history.

(56) References Cited

U.S. PATENT DOCUMENTS

| 1,765,106 | A | * | 6/1930 | Slaten | F16K 31/602 251/156 |
| 3,019,811 | A | | 2/1962 | Young et al. | |
| 3,163,458 | A | * | 12/1964 | Brandt, Jr. | A01D 46/26 294/197 |
| 3,744,752 | A | * | 7/1973 | Massey | F16K 31/602 251/292 |
| 9,879,792 | B1 | * | 1/2018 | Wyatt | F17C 13/04 |

FOREIGN PATENT DOCUMENTS

| DE | 10039808 | 2/2002 | |
| FR | 2596116 | 9/1987 | |
| FR | 3027375 | 4/2016 | |
| GB | 1280479 | 7/1972 | |
| GB | 1280479 A * | 7/1972 | ............ F16C 11/045 |

(Continued)

OTHER PUBLICATIONS

Emerson, "Kunkle Series 6000 Safety Valves," Safety and Relief Products, VCTDS-00394-EN,2017, 2 pages.

(Continued)

*Primary Examiner* — Reinaldo Sanchez-Medina
*Assistant Examiner* — Nicole Gardner
(74) *Attorney, Agent, or Firm* — Hanley, Flight & Zimmerman, LLC

(57) ABSTRACT

Methods, apparatus, systems and articles of manufacture are disclosed for valve lever apparatus for use with fluid valves. An example apparatus includes a valve stem for a fluid valve, a pin removably coupled to an end of the valve stem to receive a valve lever to manually actuate the fluid valve, and a damping material to provide a damping effect between the valve stem and the valve lever.

25 Claims, 6 Drawing Sheets

(56) References Cited

FOREIGN PATENT DOCUMENTS

JP          H05338519          12/1993

OTHER PUBLICATIONS

Patent Cooperation Treaty, "International Search Report", issued in connection with PCT/US2019/056273, dated Jan. 23, 2020, 5 pages.
Patent Cooperation Treaty, "Written Opinion", issued in connection with PCT/US2019/056273, dated Jan. 23, 2020, 6 pages.
Patent Cooperation Treaty, "International Preliminary Report on Patentability", issued in connection with PCT/US2019/056273, dated Apr. 14, 2021, 7 pages.

* cited by examiner

VALVE LEVER APPARATUS FOR USE WITH FLUID VALVES

RELATED APPLICATIONS

This patent claims priority to, and benefit of, U.S. Provisional Application 62/746,307, which was filed on Oct. 16, 2018. U.S. Provisional Application 62/746,307 is hereby incorporated by reference in its entirety.

FIELD OF THE DISCLOSURE

This disclosure relates generally to fluid valves and, more particularly, to valve lever apparatus for use with fluid valves.

BACKGROUND

Pressure relief valves are used in a variety of commercial, industrial, and domestic applications to maintain a pressure within a system below a predetermined maximum pressure. Specifically, if the pressure within the system exceeds a predetermined maximum pressure, the pressure relief valve vents a fluid or vapor to the atmosphere and/or other outlet until the pressure within the system decreases below the predetermined maximum pressure.

SUMMARY

An example apparatus comprises a valve stem for a fluid valve, a pin removably coupled to an end of the valve stem to receive a valve lever to manually operate the fluid valve, and a damping material extending around the pin to engage one or more of the valve lever, a washer disposed on the pin, or the valve stem, the damping material to provide a damping effect when the valve lever is actuated.

An example apparatus comprises a valve lever operatively coupled to a fluid valve via a valve stem, the valve lever to change a position of the fluid valve when moved, a pin movably coupling the valve lever to the valve stem, and an elastomeric ring disposed on the pin to dampen movement between the valve lever and the valve stem.

An example fluid valve comprises a stem extending out of a body of the fluid valve, a lever adjustably coupled to the stem via a pin extending from the stem to the lever, the lever to move to change a position of the fluid valve, and a damping material operatively coupled to the pin to provide a damping effect when the stem moves relative to the lever.

BRIEF DESCRIPTION OF THE DRAWINGS

The figures are not to scale. In general, the same reference numbers will be used throughout the drawing(s) and accompanying written description to refer to the same or like parts.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Valve lever apparatus for use with fluid valves disclosed herein provide improvements over known valve levers. It is common for pressure relief valves to be implemented in applications that are subject to severe vibrations (e.g., an air compressor, a vehicle, etc.). For example, pressure relief valves may include components (e.g., valve levers) with loose couplings that are prone to damage induced by vibrations. Known valve levers use vibration damping springs to reduce vibrations produced by a valve and/or a valve system that negatively affect the structural integrity of the valve lever. Such vibration damping springs are complicated and include a plurality of convoluted angles and/or shapes. As a result, known vibration damping springs are difficult and, thus, expensive to manufacture, and difficult to install within the valve. Valve lever apparatus disclosed herein include one or more damping materials (e.g., elastomeric rings) to reduce and/or eliminate vibrations imparted on a valve lever. Damping materials disclosed herein are inexpensive and easy to install, thereby reducing production costs of pressure relief valves.

Figure 1:
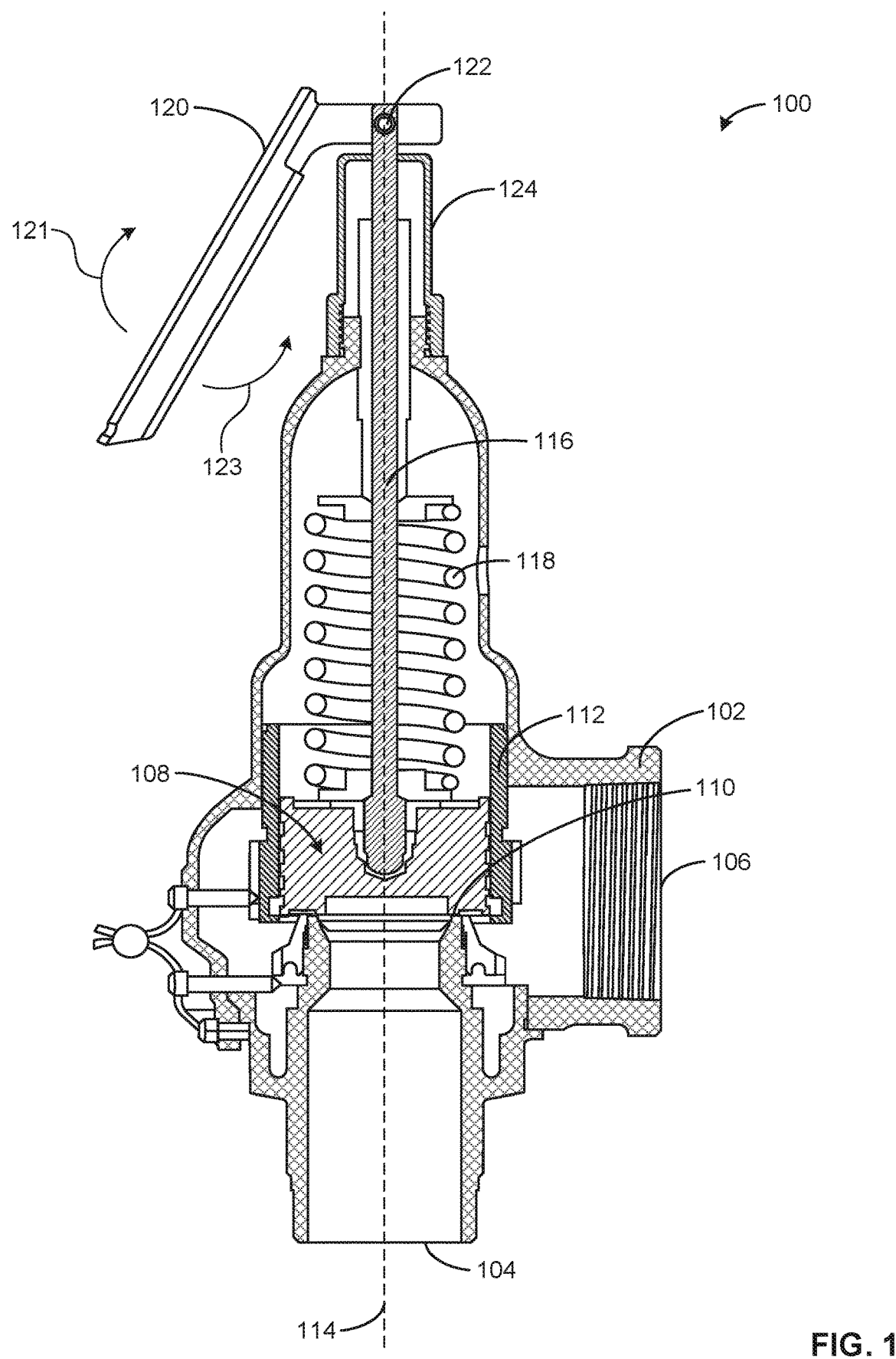
FIG. 1 is a cross-sectional view of an example fluid valve constructed in accordance with teachings of this disclosure.

FIG. 1 is a cross-sectional view of an example fluid valve 100 constructed in accordance with the teachings of this disclosure. In the illustrated example, the fluid valve 100 is a pressure relief valve. The fluid valve 100 includes an example valve body 102 defining an example inlet 104 and an example outlet 106 through which fluid enters and exits the fluid valve 100, respectively. In some examples, the inlet 104 and the outlet 106 are threadably coupled to other devices within a system (e.g., a pressure vessel, a tank, a pipe, etc.). In other examples, the outlet 106 is open relative to a surrounding environment (e.g., not fluidly coupled to a device) to vent fluid into the environment. In the illustrated example, an example valve disc 108 releasably engages an example seating surface 110 to permit or prevent fluid flow through the fluid valve 100. For example, when the valve disc 108 is in contact with (e.g., engaged with) the seating surface 110, the valve disc 108 prevents fluid from flowing from the inlet 104 to the outlet 106. When the valve disc 108 disengages from the seating surface 110 (e.g., is no longer in contact with the seating surface 110), fluid flows through the fluid valve 100 from the inlet 104 to the outlet 106.

In the illustrated example of FIG. 1, the valve disc 108 is in contact with an example guide 112. The guide 112 is sized to guide movement of the valve disc 108 as the valve disc 108 moves along a longitudinal axis 114 of the fluid valve 100 between a closed position in which the valve disc 108 sealingly engages a seating surface 110 and an open position in which the valve disc 108 is separated from the seating surface 110. For example, the guide 112 provides lateral stability and enables only vertical displacement as the valve disc 108 travels between the closed position and the open position, thereby reducing mechanical stress. In the illustrated example, the valve disc 108 is coupled to an example valve stem 116. In the illustrated example, a spring 118, which is positioned around the valve stem 116, urges the valve disc 108 and the valve stem 116 coupled thereto, toward the seating surface 110. The spring 118 exerts a predetermined force on the valve disc 108 that urges the valve disc 108 toward the seating surface 110 (i.e., downward in the orientation shown in FIG. 1) against fluid pressure at the inlet 104 of the fluid valve 100 that exerts a force (e.g., a force generated by the pressure multiplied by an area of the valve disc 108) on the valve disc 108 in the opposite direction (i.e., upward in the orientation in FIG. 1). As pressure at the inlet 104 increases, the force exerted on the valve disc 108 increases proportionally until it overcomes the predetermined force exerted by the spring 118, which causes the valve disc 108 to separate from the seating surface 110. In some examples, as inlet pressure in the fluid valve 100 further increases, the valve disc 108 moves further from the seating surface 110, allowing more fluid to flow through the fluid valve 100. In some examples, pressure decreases in the fluid valve 100 when the fluid is allowed to flow through the outlet 106, and the spring 118 urges the valve disc 108 back toward the seating surface 110 until the valve disc 108 contacts the seating surface 110.

In some examples, the fluid valve 100 may be manually actuated between an armed state and a disarmed state via an example lever 120. In the armed state, the position of the valve disc 108 is determined by the force balance between the spring 118 and the fluid pressure at the inlet 104. In the disarmed state, the stem 116 is manually retracted such that the valve disc 108 is separated from the seating surface 110 such that the fluid valve 100 is in the open position. In the illustrated example, the lever 120 is operatively coupled to the stem 116 via an example pin 122. In some examples, the pin 122 is a threaded pin. The coupling of the lever 120, the stem 116, and the pin 122 is described in further detail below. In some examples, when a force is exerted on the lever 120 (e.g., a manual force exerted by an operator to rotate the lever 120), the lever rotates about the pin 122 to actuate the stem 116 and change the state of the fluid valve 100. For example, when a force is imparted on the lever 120, the stem 116 actuates along the axis 114, to transition the fluid valve 100 between the armed and disarmed states. In some examples, the lever 120 can be rotated in a first direction 121 and a second direction 123 opposite the first direction 121. In other words, the lever 120 may be actuated by a pulling force in the first direction 121 and/or a pushing force in the second direction 123 to change the state of the fluid valve 100. Actuating by rotating in both the first direction 121 and the second direction 123 enables the lever 120 to be operable in systems with limited space and/or closely interconnected components. The lever 120 enables manual opening of the fluid valve 100 for testing and/or to manually relieve fluid pressure at the inlet 104. The fluid valve 100 of the illustrated example further includes an example cap 124. In some examples, the cap 124 is threadably coupled to the valve body 102 to prevent debris from entering the fluid valve 100.

Figure 2:
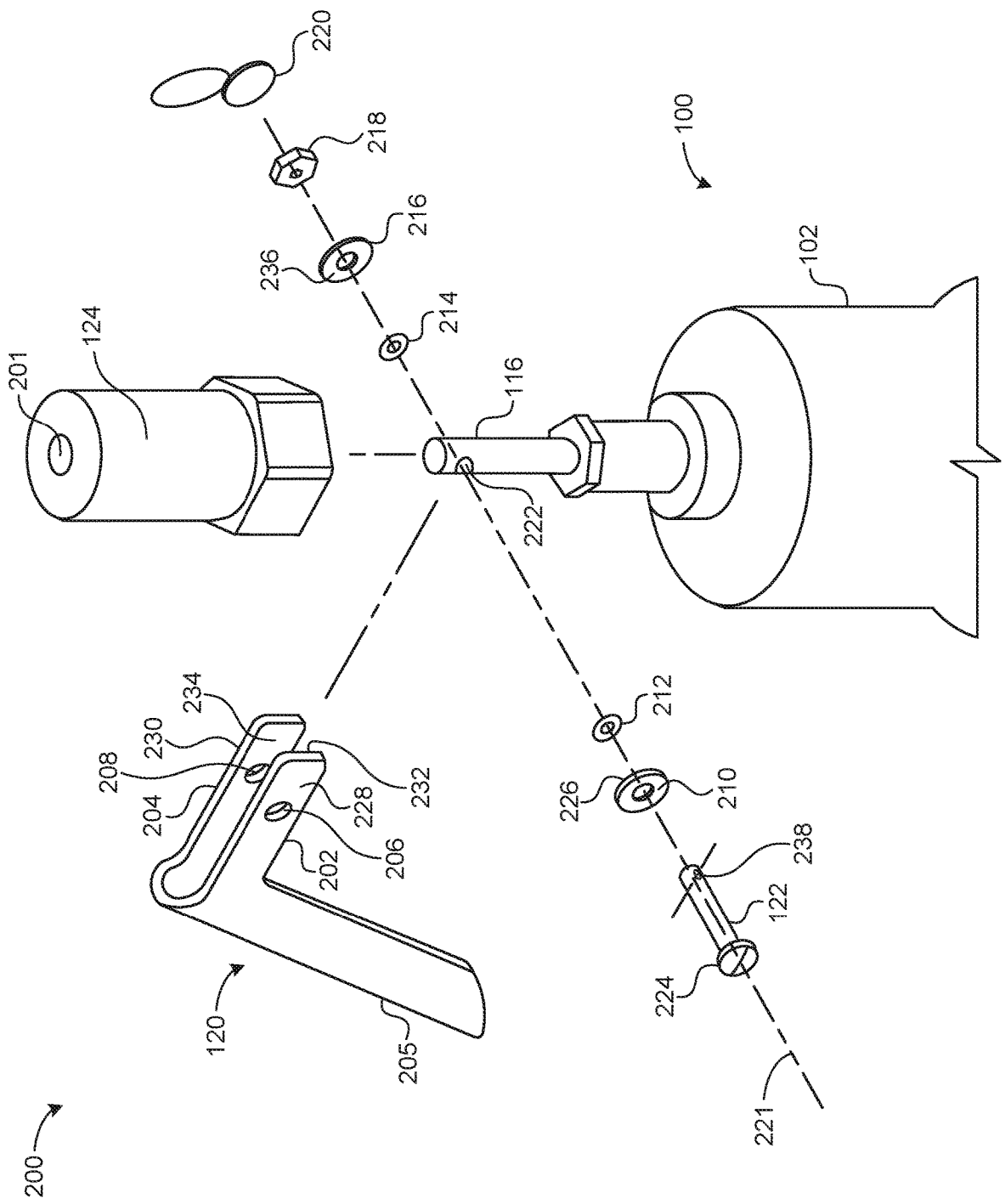
FIG. 2 is an exploded perspective view of an example lever assembly of the fluid valve of FIG. 1.

FIG. 2 is an exploded perspective view of an example lever assembly 200 of the fluid valve 100 of FIG. 1. In the illustrated example, the cap 124 includes an aperture 201 sized to receive the stem 116 when the cap 124 is threadably coupled to the valve body 102. The lever 120 is operatively coupled to the stem 116 via the pin 122. The lever 120 includes an example first arm 202, an example second arm 204, and an example handle 205. In the illustrated example, the first arm 202 and the second arm 204 are substantially parallel. The first arm 202 includes an example first aperture 206, and the second arm includes an example second aperture 208. The first aperture 206 and the second aperture 208 are coaxially aligned. The handle 205 is structured to provide an interface allowing an operator to manually actuate the lever 120.

The lever assembly 200 includes an example first washer 210, an example first damping material 212 (e.g., an O-ring, an elastomeric ring, etc.), an example second damping material 214 (e.g., an O-ring, an elastomeric ring, etc.), an example second washer 216, an example nut 218, and an example seal wire 220. In the illustrated example, the first washer 210, the first damping material 212, the second damping material 214, the second washer 216, and the nut 218 are coaxially aligned along an example central axis 221. The central axis 221 is defined by an example aperture 222 of the stem 116. In the illustrated example, the first washer 210, the first damping material 212, the second damping material 214, the second washer 216, and the nut 218 are disposed on the pin 122. In some examples, the first washer 210 is fixedly coupled to an example head 224 of the pin 122 to provide a uniformly flat first surface 226. The first damping material 212 is fixedly or slidably coupled to the first surface 226 of the first washer 210 and/or a first exterior surface 228 of the first arm 202 of the lever 120. In some examples, the first exterior surface 228 of the first arm 202 and/or a second exterior surface 230 of the second arm 204 of the lever 120 provide a uniformly flat interface to ensure a tight coupling with high friction.

In the illustrated example, the stem 116 is positioned between a first interior surface 232 of the first arm 202 and a second interior surface 234 of the second arm 204. The second damping material 214 is fixedly or slidably coupled to the second exterior surface 230 of the second arm 204 and/or an example second surface 236 of the second washer 216. In some examples, the second surface 236 of the second washer 216 provides a uniformly flat interface to ensure a tight coupling between the second washer 216 and the second damping material 214. In the illustrated example, the second washer is fixedly or slidably coupled to the nut 218. In some examples, the nut 218 imparts a force on any one of the first washer 210, the first damping material 212, the second damping material 214, or the second washer 216. In some examples, the first and second damping materials 212, 214 provide a damping effect by reducing and/or absorbing vibrations transferred to the lever 120 from any element of the fluid valve 100 or a surrounding environment. In some examples, the first damping material 212 and/or the second damping material 214 may be fixedly or slidably coupled to the first and the second interior surfaces 232, 234, respectively. In some examples, the first washer 210, the first damping material 212, the second damping material 214, the second washer 216, and the nut 218 may be disposed on the pin 122 in any position to provide a desired damping effect on the lever 120. Although FIG. 2 depicts an example with two damping materials (e.g., the first and the second damping materials 212, 214), any number of damping materials may be disposed on the pin 122 to provide desired vibration damping characteristics.

In the illustrated example of FIG. 2, the pin 122 includes an example cross-hole 238. In the illustrated example, the cross-hole 238 is positioned opposite the head 224 of the pin 122. In some examples, the cross-hole 238 is sized to receive the seal wire 220. Once the lever assembly 200 has been assembled, the seal wire 220 is coupled to the pin 122 through the cross-hole 238 to ensure that the lever assembly 200 is anti-tamper.

Figure 3:
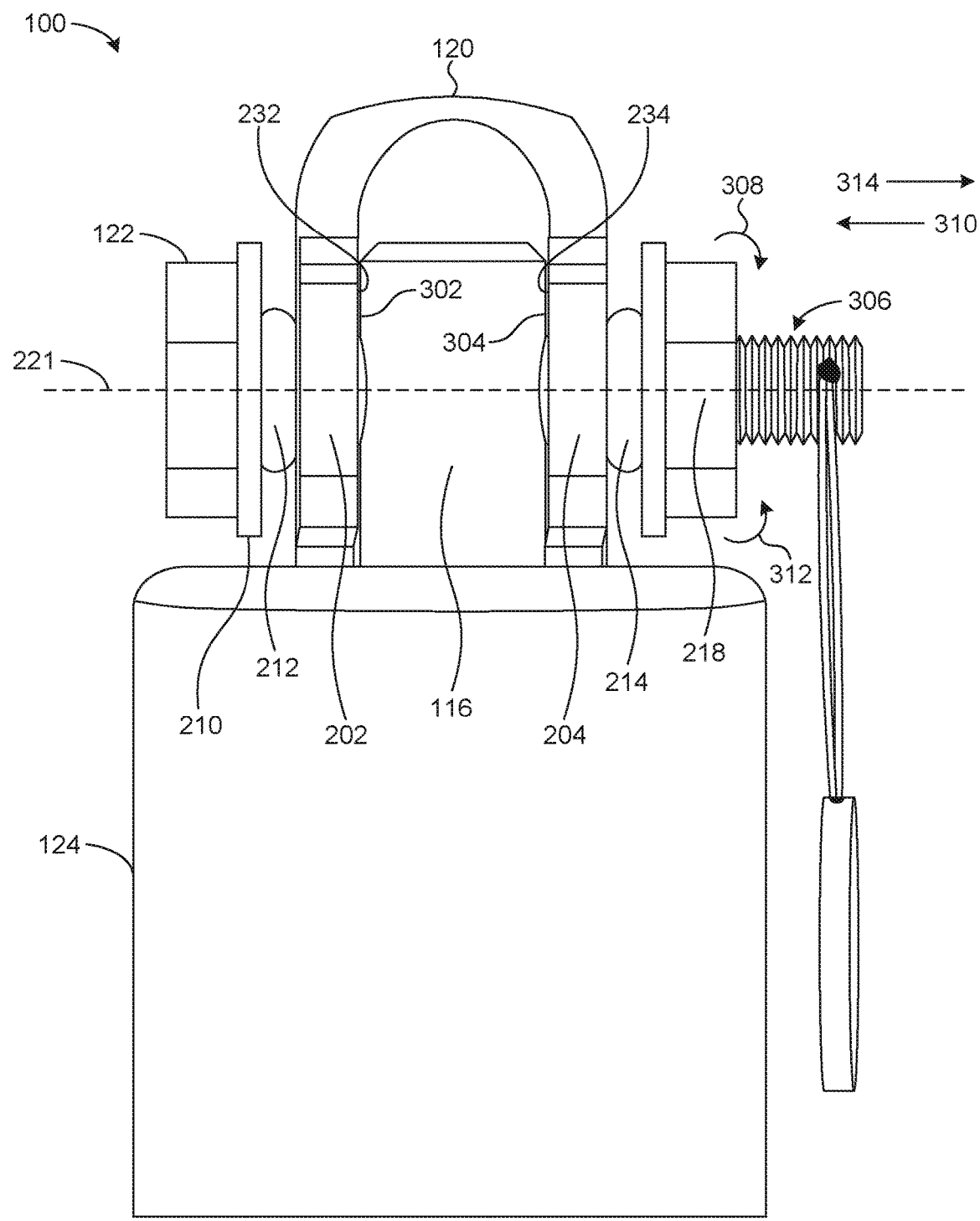
FIG. 3 is a front view of the lever assembly of FIG. 2 fully assembled.

FIG. 3 is a front view of the lever assembly 200 of FIG. 2 fully assembled. In the illustrated example, the stem 116 is positioned between the first interior surface 232 of the first arm 202 and the second interior surface 234 of the second arm 204. An example first portion 302 of the stem 116 is positioned fittingly close to the first interior surface 232 to create friction between the first portion 302 and the first interior surface 232. In the illustrated example, friction between the first portion 302 of the stem 116 and the first interior surface 232 of the first arm 202 allows the first arm 202 to squeeze the stem 116 and, thus, reduce and/or eliminate vibration effects resulting from the fluid valve 100. An example second portion 304 of the stem 116 is positioned fittingly close to the second interior surface 234 to create friction between the second portion 304 and the second interior surface 234. In the illustrated example, friction between the second portion 304 of the stem 116 and the second interior surface 234 of the second arm 204 allows the second arm 204 to squeeze the stem 116 and, thus, reduce and/or eliminate vibration effects resulting from the fluid valve 100. In the illustrated example, at least one of the first arm 202 or the second arm 204 squeezes the stem 116 to reduce and/or eliminate vibration effects while allowing the lever 120 to rotate about the axis 221 to actuate the fluid valve 100.

In the illustrated example of FIG. 3, the nut 218 is coupled to the pin 122 via example threads 306, allowing the nut 218 to rotate with respect to the pin 122 about the central axis 221. For example, rotating the nut 218 in an example first rotational direction 308 (e.g., clockwise) enables the nut 218 to travel in an example first axial direction 310 via the threads 306. Rotating the nut 218 in an example second rotational direction 312 (e.g., counterclockwise) enables the nut 218 to travel in an example second axial direction 314 via the threads 306. Movement in the first and the second axial directions 310, 314 causes a change in the magnitude of a damping effect of the first and the second damping materials 212, 214, and a change in the magnitude of friction between the stem 116 and the first and second arms 202, 204. For example, movement of the nut 218 in the first axial direction 310 increases a magnitude of the damping effect of the first and the second damping materials 212, 214, and increases a magnitude of friction between the stem 116 and the first and second arms 202, 204. Movement of the nut 218 in the second axial direction 314 decreases a magnitude of the damping effect of the first and the second damping materials 212, 214, and decreases a magnitude of friction between the stem 116 and the first and second arms 202, 204. At least one of changing the damping effect of the first and the second damping materials 212, 214 or changing the friction between the stem 116 and the first and second arms 202, 204 provides certain vibration-damping characteristics to suit the needs of a particular application.

Figure 4A:
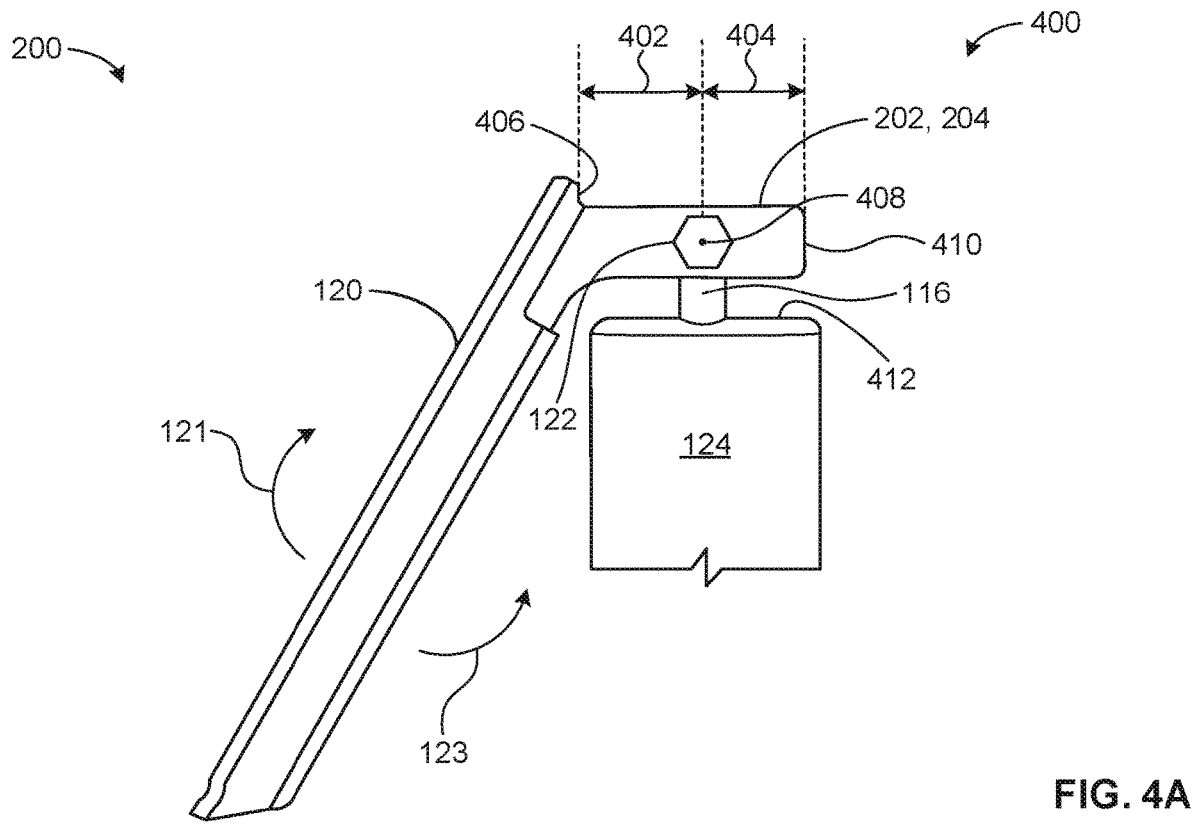
FIG. 4A is a profile view of the valve lever assembly of FIGS. 2-3 in an example first position.

FIG. 4A is a profile view of the valve lever assembly 200 of FIGS. 2-3 in a first state 400 (i.e., the armed state). The fluid valve 100 is in the armed state when the valve lever assembly 200 is in the first position 400. In the illustrated example, the first and the second arms 202, 204 of the lever 120 include an example first portion 402 and an example second portion 404. In some examples, the first portion 402 extends from an example first end 406 of the first and the second arms 202, 204 to an example center 408 of the pin 122. In some examples, the second portion 404 extends from the center 408 of the pin 122 to an example second end 410 of the first and the second arms 202, 204. In some examples, the first portion 402 and the second portion 404 are substantially the same length. In some examples, the first portion 402 and/or the second portion 404 provide a significant mechanical advantage when actuating (e.g., rotating) the lever 120. When the lever 120 is rotated in the first direction 121, the second portion 404 engages an example top surface 412 (e.g., an exterior portion) of the cap 124 to actuate the stem 116 (i.e., transition the fluid valve to the disarmed state). When the lever 120 is rotated in the second direction 123, the first portion 402 engages the top surface 412 of the cap 124 to actuate the stem 116 (i.e., transition the fluid valve to the disarmed state).

Figure 4B:
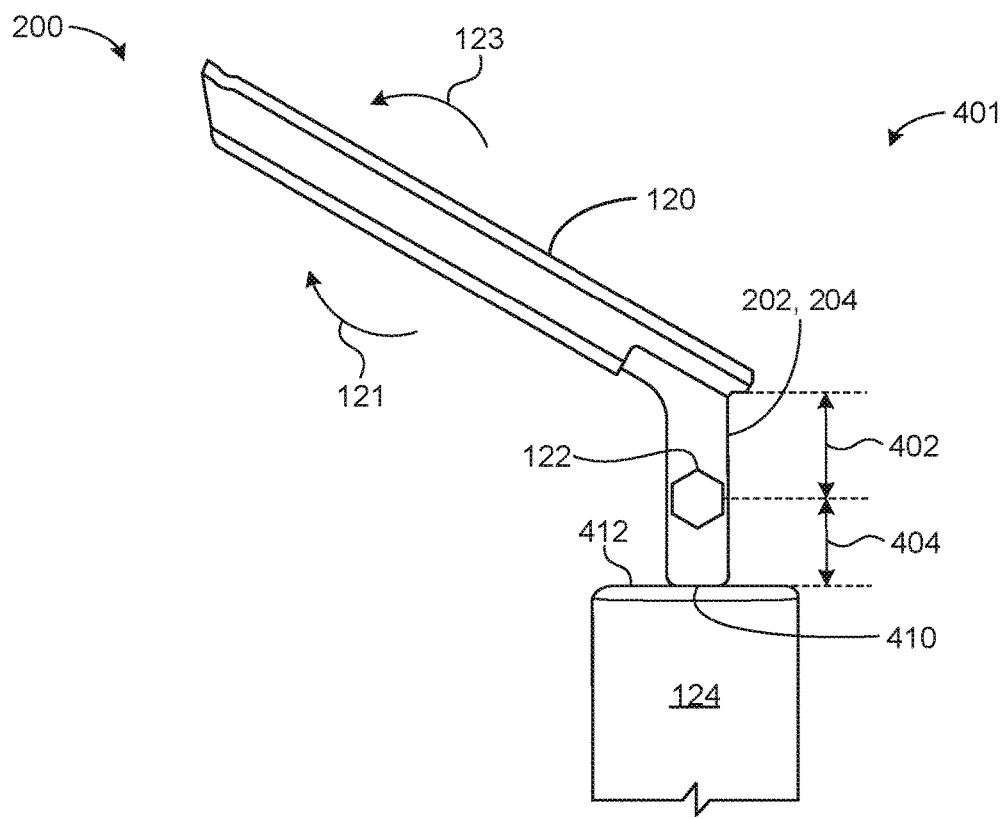
FIG. 4B is a profile view of the valve lever assembly of FIGS. 2-3 in an example second position.

FIG. 4B is a profile view of the valve lever assembly 200 of FIGS. 2-3 in a second position 401. The fluid valve 100 is locked in the disarmed state when the valve lever assembly 200 is in the second position 401. As described above, the fluid valve 100 is in the open position in the disarmed state. In the illustrated example, the lever 120 is rotated in the first direction 121 until the second end 410 of the first and the second arms 202, 204 makes contact with the top surface 412 of the cap 124. When the second end 410 contacts the top surface 412, the second end 410 is substantially flush with the top surface 412. In some examples, the lever 120 remains in the second position 401 until a force is imparted on the lever 120. For example, the lever 120 maintains a contact between the second end 410 and the top surface 412 to maintain the disarmed state and the open position of the fluid valve 100 until a force is imparted on the lever in the second direction 123. When a force is imparted on the lever 120 in the second direction 123, the lever 120 returns to the first position 400 and thus the armed state.

Figure 5:
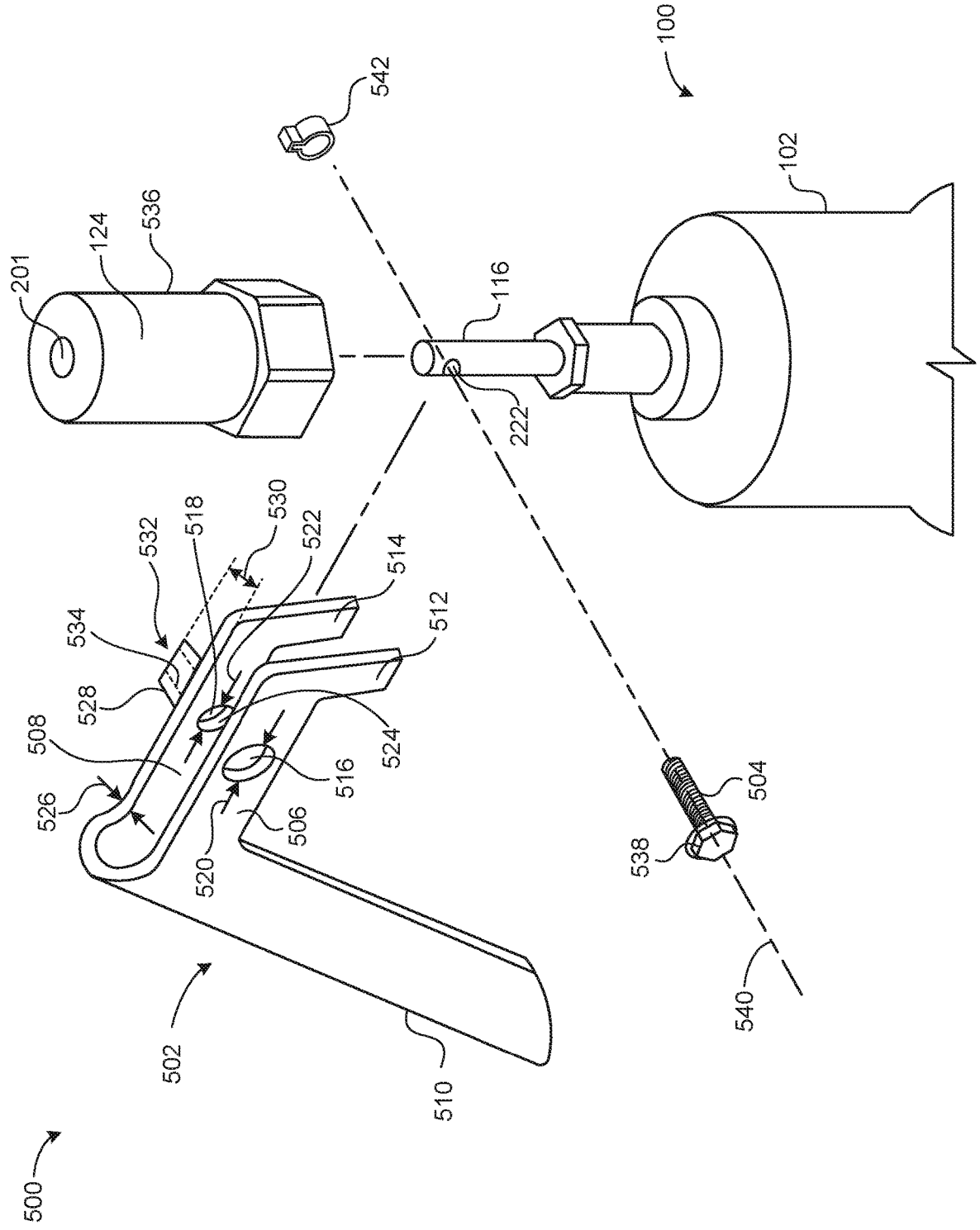
FIG. 5 is an exploded perspective view of a second example lever assembly of the fluid valve of FIG. 1.

FIG. 5 is an exploded perspective view of a second example lever assembly 500 of the fluid valve 100 of FIG. 1. In the illustrated example, the cap 124 includes the aperture 201 sized to receive the stem 116 when the cap 124 is threadably coupled to the valve body 102. An example lever 502 is operatively coupled to the stem 116 via an example thread forming screw 504. The lever 502 includes an example first arm 506, an example second arm 508, an example handle 510, an example first hook 512, and an example second hook 514. In other examples, the lever 502 does not include the first and second hooks 512, 514. In the illustrated example, the first arm 506 and the second arm 508 are substantially parallel. The first arm 506 includes an example first aperture 516, and the second arm 508 includes an example second aperture 518. In the illustrated example, the first aperture 516 and the second aperture 518 are coaxially aligned. In the illustrated example, the first aperture 516 has a first diameter 520 sized to receive the thread forming screw 504 without threadably engaging the thread forming screw 504. In the illustrated example, the second aperture 518 has a second diameter 522 sized to receive the thread forming screw 504. In the illustrated example, the thread forming screw 504 threadably engages the second aperture 518 and, thus, the thread forming screw 504 forms sufficient threads (e.g., 2-3 rows of threads) on an inner surface 524 of the second aperture 518. In some examples, a threaded engagement between the thread forming screw 504 and the second aperture 518 provides a damping effect and/or reduces or eliminates vibrations transferred from any element of the fluid valve 100 or a surrounding environment.

In some examples, a first thickness 526 of the second arm 508 is below a threshold thickness (e.g., below 0.1 inch).

When below the threshold thickness, the first thickness 526 is not large enough to allow the thread forming screw 504 to form sufficient threads (e.g., 2-3 rows of threads) on the inner surface 524 of the second aperture 518. In some examples, an example insert 528 is attached to the second arm 508 to create an example second thickness 530, greater than the first thickness 526. The insert 528 includes an example third aperture 532 with substantially the same diameter as the second aperture 518. In the illustrated example, the third aperture 532 and the second aperture 518 are coaxially aligned. In the illustrated example, a combination of the second aperture 518 and the third aperture 532 allows the thread forming screw 504 to form sufficient threads (e.g., 2-3 rows of threads) on the inner surface 524 of the second aperture 518 and an example inner surface 534 of the third aperture 532. In other examples, the threshold thickness and the sufficient threads may be any value.

In the illustrated example of FIG. 5, the handle 510 is structured to provide an interface allowing an operator to manually actuate the lever 502. When actuated, the lever 502 is restricted from maintaining the disarmed state of the fluid valve 100 by the first and second hooks 512, 514. For example, when the lever 502 is actuated, the first and second hooks 512, 514 engage an example outer wall 536 of the cap 124 to restrict the lever 502 from maintaining the disarmed state of the fluid valve 100.

In the illustrated example of FIG. 5, the thread forming screw 504 includes an example head 538. The thread forming screw 504 is aligned along an example central axis 540. The central axis 540 is defined by the aperture 222 of the stem 116. Once the lever assembly 500 has been assembled, an example sleeve 542 (e.g., a metallic sleeve) is disposed on the thread forming screw 504 along the central axis 540. In some examples, the sleeve 542 is color-coded to indicate an assembler and/or manufacturer of the lever assembly 500. In some examples, the sleeve 542 is press-fitted onto the thread forming screw 504, causing the sleeve 542 to adhere to the thread forming screw 504. Adhering the sleeve 542 to the thread forming screw 504 ensures that the lever assembly 500 is anti-tamper. In other words, the sleeve 542 cannot be removed from the thread forming screw 504 without deforming or destroying the sleeve 542.

Figure 6:
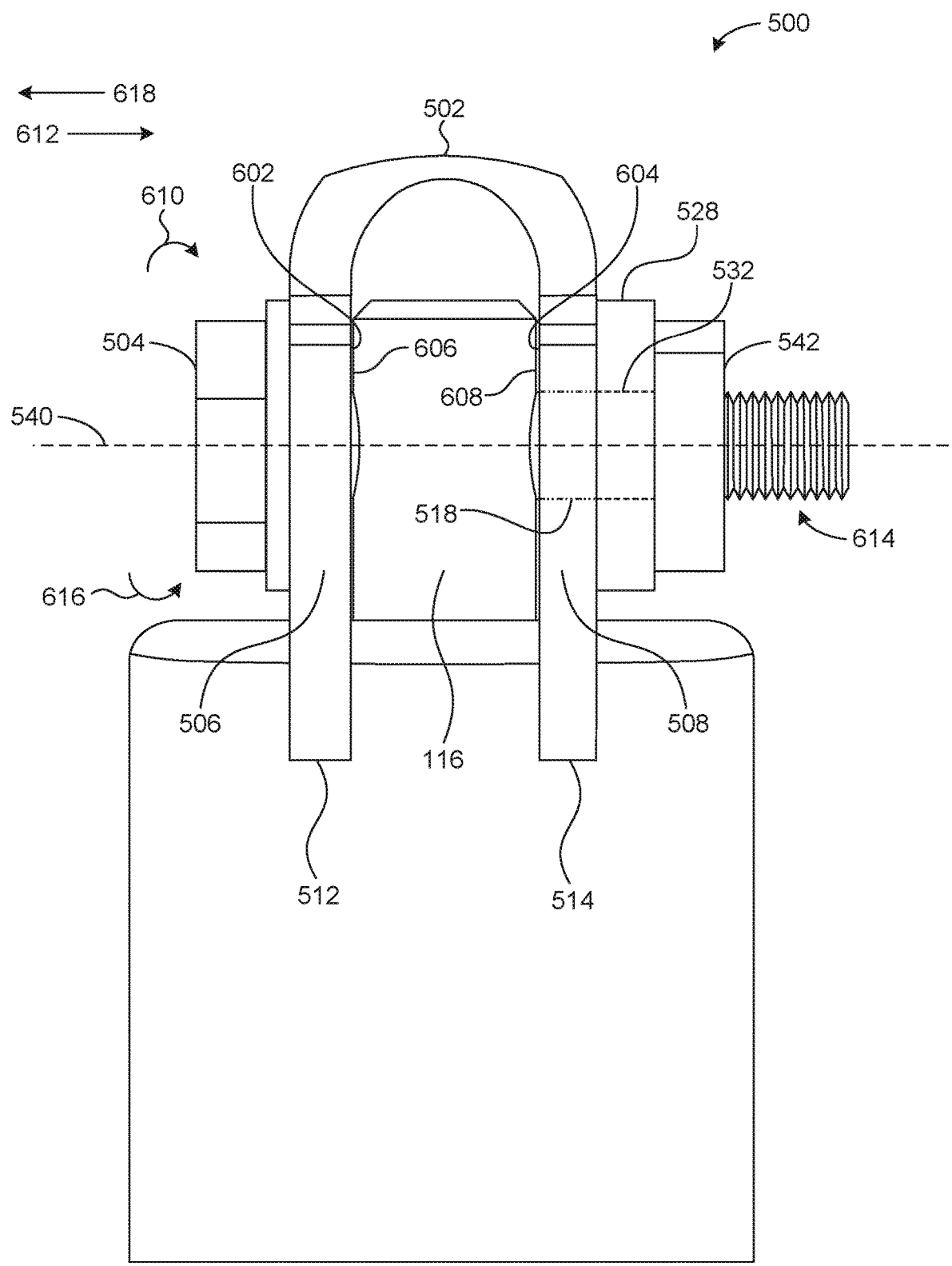
FIG. 6 is a front view of the lever assembly of FIG. 5 fully assembled.

FIG. 6 is a front view of the lever assembly 500 of FIG. 5 fully assembled. In the illustrated example, the stem 116 is positioned between an example first interior surface 602 of the first arm 506 and an example second interior surface 604 of the second arm 508. An example first portion 606 of the stem 116 is positioned fittingly close to the first interior surface 602 to create friction between the first portion 606 and the first interior surface 602. In the illustrated example, friction between the first portion 606 of the stem 116 and the first interior surface 602 of the first arm 506 allows the first arm 506 to squeeze the stem 116 and, thus, reduce and/or eliminate vibration effects resulting from the fluid valve 100. An example second portion 608 of the stem 116 is positioned fittingly close to the second interior surface 604 to create friction between the second portion 608 and the second interior surface 604. In the illustrated example, friction between the second portion 608 of the stem 116 and the second interior surface 604 of the second arm 508 allows the second arm 508 to squeeze the stem 116 and, thus, reduce and/or eliminate vibration effects resulting from the fluid valve 100. In the illustrated example, at least one of first arm 506 or the second arm 508 squeezes the stem 116 to reduce and/or eliminate vibration effects while allowing the lever 502 to rotate about the axis 540 to actuate the fluid valve 100.

In the illustrated example of FIG. 6, the thread forming screw 504 is disposed in the aperture 222 (FIG. 2) of the stem 116 along the central axis 540. The sleeve 542 is disposed on the thread forming screw 504. The thread forming screw 504 is threadably coupled to the second aperture 518 of the second arm 508. In some examples, the thread forming screw 504 is rotatable with respect to stem 116 about the central axis 540. For example, rotating the thread forming screw 504 in an example first rotational direction 610 (e.g., clockwise) enables the thread forming screw 504 to travel in an example first axial direction 612 via example threads 614. Rotating the thread forming screw 504 in an example second rotational direction 616 (e.g., counterclockwise) enables the thread forming screw 504 to travel in an example second axial direction 618 via the threads 614. Movement in the first and second axial directions 612, 618 causes a change in the magnitude of friction between the stem 116 and the first and second arms 506, 508. For example, movement of the thread forming screw 504 in the first axial direction 612 increases a magnitude of friction between the stem 116 and the first and second arms 506, 508. Movement of the thread forming screw 504 in the second axial direction 618 decreases a magnitude of friction between the stem 116 and the first and second arms 506, 508.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, and (6) B with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

From the foregoing, it will be appreciated that example methods, apparatus and articles of manufacture have been disclosed that enable a valve lever apparatus to provide certain damping characteristics when the valve lever is actuated. Example valve lever apparatus have been disclosed that include damping materials (e.g., elastomeric rings) that are adjustable to provide a desired damping effect. Valve lever apparatus have been disclosed that are easier to assemble and that significantly decrease production costs. Furthermore, example valve lever apparatus have been disclosed that may be actuated by rotating in a first direction and a second direction opposite the first direction. Bidirectional actuation allows disclosed valve levers to be operable in systems with limited space and/or closely interconnected components. Example valve lever apparatus have been disclosed that maintain a fluid valve in a disarmed state until a force is imparted on the valve lever.

Example methods, apparatus, systems, and articles of manufacture to valve lever apparatus for use with fluid valves are disclosed herein. Further examples and combinations thereof include the following: Example 1 includes an apparatus, comprising a valve stem for a fluid valve, a pin removably coupled to an end of the valve stem to receive a valve lever to manually operate the fluid valve, and a damping material extending around the pin to engage one or more of the valve lever, a washer disposed on the pin, or the valve stem, the damping material to reduce a magnitude of vibrations that are transferred to the valve lever.

Example 2 includes the apparatus of example 1, further including a nut coupled to the pin to impart a force on the damping material, the nut to rotate relative about the pin to change a magnitude of a damping effect.

Example 3 includes the apparatus of example 1, wherein the damping material is between the washer and the valve lever.

Example 4 includes the apparatus of example 1, wherein the valve lever squeezes the valve stem to further reduce the magnitude of vibrations that are transferred to the valve lever.

Example 5 includes the apparatus of example 1, wherein the valve lever rotates about a pin's longitudinal axis to cause the valve stem to move along a valve stem's longitudinal axis.

Example 6 includes the apparatus of example 5, wherein the valve lever is configured to rotate in either a first direction or a second direction about the pin's longitudinal axis.

Example 7 includes the apparatus of example 5, wherein the valve lever is configured to move between a first position and a second position, wherein the fluid valve is in an armed state when the valve lever is in the first position and a disarmed state when the valve lever is in the second position, and wherein the valve lever is configured to remain in the second position until a force is imparted on the valve lever.

Example 8 includes an apparatus, comprising a valve lever operatively coupled to a valve stem of a fluid valve, a pin that couples the valve lever to the valve stem, wherein the valve lever is configured to rotate about the pin to move the valve stem, and an elastomeric ring disposed on the pin to reduce a magnitude of movement that is transferred between the valve lever and the valve stem.

Example 9 includes the apparatus of example 8, further including a nut coupled to the pin, wherein the nut is rotatable about the pin to change a damping effect of the elastomeric ring.

Example 10 includes the apparatus of example 8, wherein the valve lever squeezes the valve stem to further reduce the magnitude of movement between the valve lever and the valve stem.

Example 11 includes the apparatus of example 8, wherein the valve lever is rotatable between a first position and a second position to adjust a state of the fluid valve.

Example 12 includes the apparatus of example 11, wherein the valve lever is configured to be maintained in the second position until a force is imparted on the valve lever, and wherein the fluid valve is in a disarmed state when the valve lever is in the second position.

Example 13 includes the apparatus of example 8, wherein the valve lever includes a first portion extending from the pin in a first direction and a second portion extending from the pin in a second direction opposite to the first direction, and wherein the first or second portion is configured to engage an exterior portion of the fluid valve to move the valve stem.

Example 14 includes a fluid valve, comprising a stem extending out of a body of the fluid valve, a lever adjustably coupled to the stem via a pin, wherein the lever is movable to change a position of the stem, and a damping material operatively coupled to the pin to provide a damping effect between the stem and the lever.

Example 15 includes the fluid valve of example 14, further comprising a nut operatively coupled to the pin to impart a force on the damping material, wherein the nut is configured to rotate about the pin to adjust the damping effect.

Example 16 includes the fluid valve of example 14, wherein the damping material is between a washer and the lever.

Example 17 includes the fluid valve of example 16, wherein the lever is positioned fittingly close to the stem to reduce a magnitude of vibrations that are transferred to the lever.

Example 18 includes the fluid valve of example 14, wherein the lever is configured to rotate about an axis defined by an aperture in the stem.

Example 19 includes the fluid valve of example 18, wherein the lever is rotatable in a first and a second direction about the axis.

Example 20 includes the fluid valve of example 18, wherein the lever is rotatable between a first position and a second position, wherein the fluid valve is in an armed state when the lever is in the first position and a disarmed state when the lever is in the second position, and wherein the lever is configured to remain in the second position until a force is imparted on the lever.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus, comprising:
   a valve stem for a fluid valve;
   a pin removably coupled to an end of the valve stem to receive a valve lever to manually operate the fluid valve;
   a first damping material extending around the pin to engage the pin, the valve lever, and a first washer disposed on the pin, the first damping material between the first washer and the valve level; and
a second damping material extending around the pin to engage (a) the pin, the valve lever, and a second washer disposed on the pin, or (b) the pin, the valve lever, and the valve stem, the second damping material spaced apart from the first damping material, the first damping material and the second damping material to reduce a magnitude of vibrations that are transferred to the valve lever.

2. The apparatus of claim 1, further including a nut coupled to the pin to impart a force on at least one of the first damping material or the second damping material, the nut to rotate relative to the pin to change a magnitude of a damping effect.

3. The apparatus of claim 1, wherein the valve lever is to squeeze the valve stem to further reduce the magnitude of vibrations that are transferred to the valve lever.

4. The apparatus of claim 1, wherein the valve lever is rotatable about a longitudinal axis of the pin to cause the valve stem to move along a longitudinal axis of the valve stem.

5. The apparatus of claim 4, wherein the valve lever is rotatable in either a first direction or a second direction about the longitudinal axis of the pin.

6. The apparatus of claim 5, wherein the valve stem is to translate in a third direction when the valve lever is rotated in the first direction or the second direction.

7. An apparatus, comprising:
a valve stem for a fluid valve;
a pin removably coupled to an end of the valve stem to receive a valve lever to manually operate the fluid valve, the valve lever rotatable about a longitudinal axis of the pin to cause the valve stem to move along a longitudinal axis of the valve stem, the valve lever to move between a first position and a second position, the fluid valve in an armed state when the valve lever is in the first position and a disarmed state when the valve lever is in the second position, and the valve lever to remain in the second position until a force is imparted on the valve lever;
a first damping material extending around the pin to engage (a) the pin, the valve lever, and a first washer disposed on the pin or (b) the pin, the valve lever, and the valve stem; and
a second damping material extending around the pin to engage (a) the pin, the valve lever, and a second washer disposed on the pin, or (b) the pin, the valve lever, and the valve stem, the second damping material spaced apart from the first damping material, the first damping material and the second damping material to reduce a magnitude of vibrations that are transferred to the valve lever.

8. The apparatus of claim 7, wherein the disarmed state is associated with the fluid valve being in an open state.

9. The apparatus of claim 7, further including a nut coupled to the pin to impart a force on at least one of the first damping material or the second damping material, the nut to rotate relative to the pin to change a magnitude of a damping effect.

10. The apparatus of claim 7, wherein the valve lever is to squeeze the valve stem to further reduce the magnitude of vibrations that are transferred to the valve lever.

11. The apparatus of claim 7, wherein the valve lever is rotatable about the longitudinal axis of the pin to cause the valve stem to move along the longitudinal axis of the valve stem.

12. The apparatus of claim 11, wherein the valve lever is rotatable in either a first direction or a second direction about the longitudinal axis of the pin.

13. An apparatus, comprising:
a valve lever operatively coupled to a valve stem of a fluid valve, the valve lever rotatable between a first position and a second position to adjust a state of the fluid valve, the state of the fluid valve to transition between an armed state in which the fluid valve is closed and a disarmed state in which the fluid valve is at least partially open when the valve lever is rotated between the first position and the second position, and when the valve lever is in the second position, the valve lever is to remain in the second position until a force is imparted on the valve lever;
a pin that couples the valve lever to the valve stem, the valve lever is to rotate about the pin to move the valve stem; and
an elastomeric ring disposed on the pin and engaged with the valve lever and the valve stem, the elastomeric ring to reduce a magnitude of movement that is transferred between the valve lever and the valve stem.

14. The apparatus of claim 13, further including a nut coupled to the pin, wherein the nut is rotatable about the pin to change a damping effect of the elastomeric ring.

15. The apparatus of claim 13, wherein the valve lever is to squeeze the valve stem to further reduce the magnitude of movement between the valve lever and the valve stem.

16. The apparatus of claim 13, wherein the valve lever includes a first portion extending from the pin in a first direction and a second portion extending from the pin in a second direction opposite to the first direction, and wherein the first portion or second portion is to engage an exterior portion of the fluid valve to cause the valve stem to move.

17. A fluid valve, comprising:
a stem extending out of a body of the fluid valve;
a lever adjustably coupled to the stem via a pin, the lever movable to change a position of the stem;
a first damping material operatively coupled to the pin on a first side of the stem; and
a second damping material operatively coupled to the pin on a second side of the stem opposite the first side, the second damping material spaced apart from the first damping material, the second damping material disposed between a surface of the lever and a surface of a washer disposed on the pin, the surface of the washer opposite the surface of the lever, the first damping material and the second damping material to provide a damping effect between the stem and the lever.

18. The fluid valve of claim 17, further including a nut operatively coupled to the pin to impart a force on at least one of the first damping material or the second damping material, wherein the nut is to rotate about the pin to adjust the damping effect.

19. The fluid valve of claim 17, wherein the lever is positioned fittingly close to the stem to reduce a magnitude of vibrations that are transferred to the lever.

20. The fluid valve of claim 17, wherein the lever is to rotate about an axis defined by an aperture in the stem.

21. The fluid valve of claim 20, wherein the lever is rotatable in a first direction about the axis and a second direction about the axis.

22. The fluid valve of claim 21, wherein rotation of the lever in the first direction or the second direction is to cause the stem to move in a third direction along a longitudinal axis of the stem.

23. The fluid valve of claim 21, wherein the lever is rotatable from a first position in the first direction and the second direction, wherein the fluid valve is in a closed state when the lever is in the first position.

24. The fluid valve of claim 20, wherein the lever is rotatable between a first position and a second position, wherein the fluid valve is in an armed state when the lever is in the first position and a disarmed state when the lever is in the second position, and wherein the lever is configured to remain in the second position until a force is imparted on the lever.

25. The fluid valve of claim 24, wherein the fluid valve is at least partially open in the disarmed state.

* * * * *

UNITED STATES PATENT AND TRADEMARK OFFICE
CERTIFICATE OF CORRECTION

PATENT NO. : 11,719,357 B2
APPLICATION NO. : 16/600192
DATED : August 8, 2023
INVENTOR(S) : Edwards et al.

It is certified that error appears in the above-identified patent and that said Letters Patent is hereby corrected as shown below:

In the Claims

On Column 11, Line 2, Claim 1, delete "level" and insert --lever--.

Signed and Sealed this
Twelfth Day of September, 2023

Katherine Kelly Vidal
*Director of the United States Patent and Trademark Office*